United States Patent
Merry et al.

(10) Patent No.: US 7,802,204 B2
(45) Date of Patent: Sep. 21, 2010

(54) DATA VISUALIZATION FOR SERVICE REQUESTS

(75) Inventors: Remick D. Merry, Seattle, WA (US); Kenneth J. Paoletti, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 708 days.

(21) Appl. No.: 11/198,033

(22) Filed: Aug. 5, 2005

(65) Prior Publication Data

US 2007/0033546 A1      Feb. 8, 2007

(51) Int. Cl.
*G06F 19/00*    (2006.01)
*G06F 3/048*    (2006.01)
*G06F 3/01*     (2006.01)

(52) U.S. Cl. .................. 715/846; 715/837; 715/764

(58) Field of Classification Search ............ 715/837, 715/846
See application file for complete search history.

(56) References Cited

U.S. PATENT DOCUMENTS

| | | | |
|---|---|---|---|
| 6,396,516 B1 * | 5/2002 | Beatty | 715/764 |
| 6,418,361 B2 * | 7/2002 | Sinex | 701/29 |
| 6,732,027 B2 * | 5/2004 | Betters et al. | 701/29 |
| 6,854,088 B2 * | 2/2005 | Massengale et al. | 715/764 |
| 6,885,921 B1 * | 4/2005 | Farmer | 701/29 |
| 6,901,318 B1 * | 5/2005 | Morronigiello et al. | 701/29 |
| 2002/0065698 A1 * | 5/2002 | Schick et al. | 705/8 |
| 2002/0178147 A1 * | 11/2002 | Arroyo et al. | 707/2 |

OTHER PUBLICATIONS

Hirakawa, et al., A Framework for Construction of Icon Systems, Oct. 1988, IEEE Electronic Library, p. 70.*

* cited by examiner

*Primary Examiner*—William L Bashore
*Assistant Examiner*—Jordany Núñez
(74) *Attorney, Agent, or Firm*—Yee & Associates, P.C.; Steven R. Corey (57) ABSTRACT

A method for generating information associated with items being serviced comprises receiving information associated with at least one item for servicing, wherein a priority value, a due date and at least one service request are associated with each item and receiving at least one message for each item, wherein a message includes an updated priority value for each item. The method further comprises receiving a status update for each item and generating an icon for each item, wherein the icon visually indicates the updated priority value, the due date and the status update for each item.

19 Claims, 11 Drawing Sheets

Registration No.: NRY123    Days Before Release: 12    Check: D
Variable No.: PY123    905    Hours: 43,111    Cycles: 52,929

900

| Status | Priority | Description | Due Date | Type | Service Request |
|---|---|---|---|---|---|
| RED | H | Corrosion removal in MLG pressure floor web | 06-May-2004 | B2 | 1-24206341 |
| Completed | | Crease Beam Repair | 12-May-2004 | B2 | 1-23464445 |
| GREEN | M | AFT CARGO DOOR CUTOUT FWD FRAME | 12-May-2004 | B2 | 1-24687530 |
| GREEN | H | AFT CARGO DOOR CUTOUT FWD FRAME | 14-May-2004 | B2 | 1-25405695 |
| GREEN | M | MAIN CARGO DOOR LATCH FITTINGS OS HOLES | 21-May-2004 | Sonic | 1-26613371 |
| GREEN | L | Cracked 65-45778-73 Skin at BS 944 - 947 | 25-May-2004 | B2 | 1-26508376 |
| | | | | | |
| | | | | | |
| | | | | | |
| | | | | | |
| | | | | | |
| | | | | | |
| | | | | | |
| | | | | | |
| | | | | | |

NAVIGATION
- Priority Chart

Sort
- Status
- Description
- Due Date
- Type
- Service Request
- Priority

DATA VISUALIZATION FOR SERVICE REQUESTS

BACKGROUND OF THE INVENTION

The present invention generally relates to management of service requests and, more particularly, to data visualization of service requests.

Service companies encompass a wide variety of industries including aviation, automotive, construction, medical, military and aerospace. In performing its duties, a service company must intake service requests from its customers and complete them in a timely and satisfactory manner. The management of service requests can be a complicated task, where a variety of factors must be taken into account, such as the due date of the request, the priority of the request, dependencies on other requests, etc. The service company must further determine how to allocate labor and other service company resources towards completing the service requests, based on the aforementioned factors. The problem of managing service requests in such an environment is compounded when the number of service requests that are handled increases dramatically.

The task of managing multiple service requests becomes more difficult when customers interact with the service company during performance of service requests. A customer may review priorities, add additional service requests or change due dates, all during the life cycle of a service request. When factors change during execution, the service company must re-shuffle service requests to once again determine priorities and calculate division of labor and allocation of service company resources. This can be tedious, time-consuming and results in a constantly changing picture of service requests and their priorities.

One approach to this problem is a message-driven software system whereby service requests, or messages, are organized by due date. This system arranges service requests by due-date and allows the service company and the customer to view the status of a service request. The system also allows a customer to communicate with the service company via messages during execution of service requests in order to edit service requests, provide additional information about a service request or add additional service requests. Because this system only takes due dates into account when listing service requests, however, the actual priority of the item being serviced must be calculated by an administrator or other person based on a variety of other factors. This includes reading and processing of messages received from the customer and contacting customers or field service representatives via telephone or email to ensure correct prioritization of items being serviced. Constantly processing messages from a customer and re-calculating priorities in a non-automated fashion is time-consuming and burdensome. This problem is compounded when many, sometimes thousands, of messages are received in one day. Often, messages are overlooked and service requests are not properly prioritized, leading to missed deadlines and unhappy customers.

As can be seen, there is a need for an improved automated system for managing service requests. Moreover, there is a need for an automated method for dynamically organizing multiple service requests as factors change during execution.

SUMMARY OF THE INVENTION

In one aspect of the present invention, a method for generating information associated with items being serviced comprises receiving information associated with at least one item for servicing, wherein a priority value, a due date and at least one service request are associated with each item and receiving at least one message for each item, wherein a message includes an updated priority value for each item. The method further comprises receiving a status update for each item and generating an icon for each item, wherein the icon visually indicates the updated priority value, the due date and the status update for each item.

In another aspect of the present invention, a method for generating information associated with vehicles being serviced comprises receiving information associated with a plurality of vehicles for servicing, wherein a priority value, a due date and at least one service request are associated with each vehicle and receiving from an operator of a first vehicle at least one message for the first vehicle, wherein a message includes an updated priority value for the first vehicle. The method further comprises receiving a status update for each vehicle and displaying in a graphical user interface an icon for each vehicle, wherein the icon visually indicates the priority value, the updated priority value, if any, the due date and the status update for a vehicle.

In still another aspect of the present invention, a system for generating information associated with items being serviced comprises a memory for storing at least one item for servicing, wherein a priority value, a due date and at least one service request are associated with each item. The system further comprises a receiver for receiving information associated with at least one message for each item, wherein a message includes an updated priority value for each item, and for receiving a status update for each item. The system further comprises a processor configured for generating an icon for each item, wherein the icon visually indicates the updated priority value, the due date and the status update for each item.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The service request management system of the present invention may be used, for example, by any service company that manages service requests including aviation, automotive, construction, medical, military and aerospace industries. The present invention provides an improved automated system for managing service requests by automatically and dynamically organizing multiple service requests, even as factors change during execution, and presenting them in a simple and easily interpretable interface. The present invention provides a method for dynamically calculating and displaying the status of items being serviced using an interface that is simple and easy to understand. The method of the present invention processes all information pertinent to items being serviced, including item attributes, messages pertaining to the items, service requests on the items, and status updates on the items and service requests, and generates an image for displaying the status of each item, wherein the image includes an icon for each item and each icon visually indicates a variety of information, such as an updated priority value, a due date and the status for each item.

The present invention differs from the prior art by taking more than just a due date into account when determining the status of a service request. The present invention determines the status of a service request by calculating priority information received: a) with the service request and b) by messages at a later time. The present invention further differs from the prior art by allowing the operator or owner of the item being serviced to: a) interact with the service request management system during servicing and b) provide priority information that is taken into account by the system when determining the status of items. The present invention also differs from the prior art by utilizing an icon and other graphical attributes to display information about the status of items being serviced.

Figure 1:
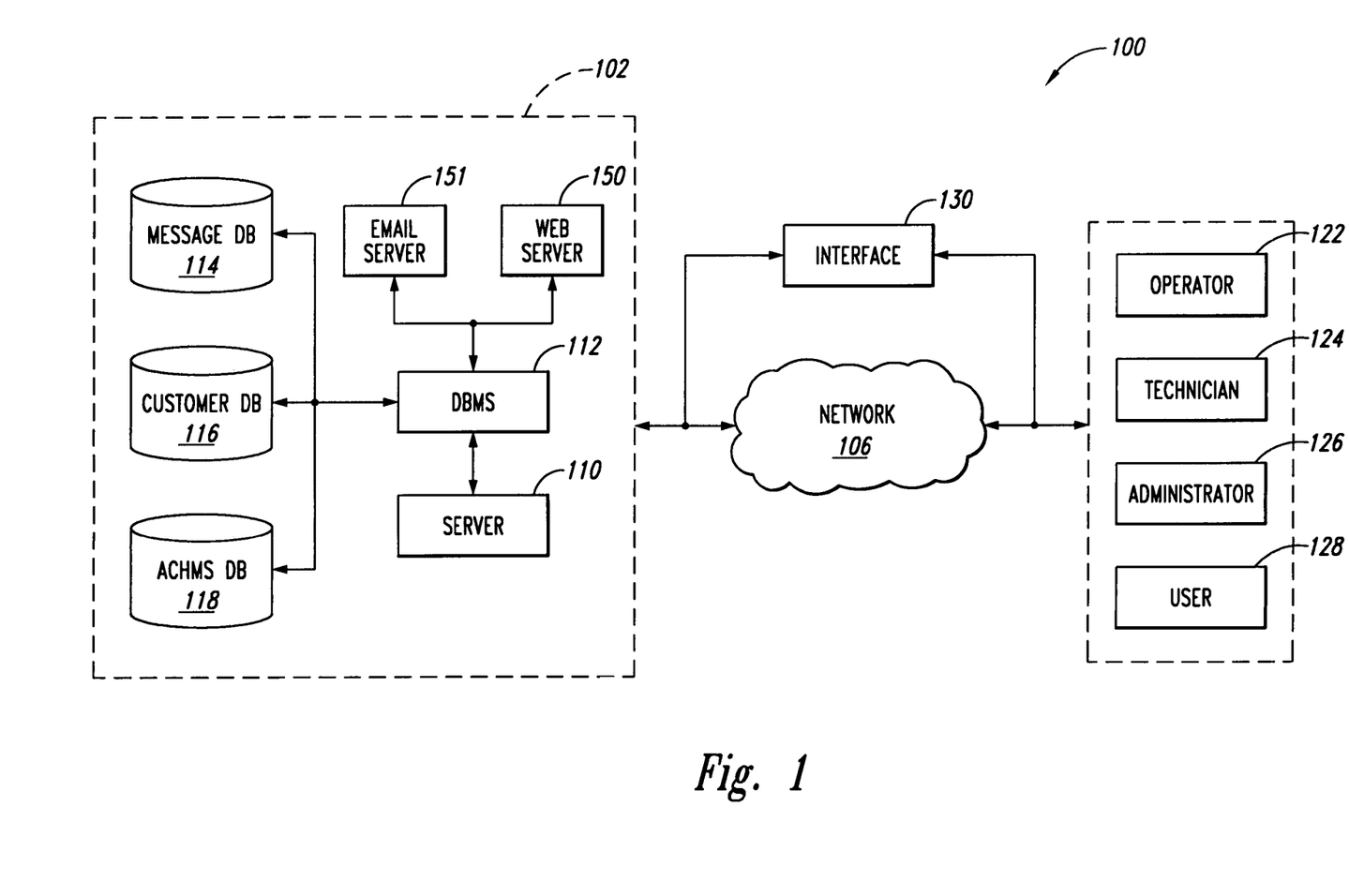
FIG. 1 is a block diagram showing the network architecture of one embodiment of the present invention.

FIG. 1 is a block diagram showing the network architecture 100 of one embodiment of the present invention. The exemplary embodiments of the present invention adhere to the network architecture 100 of FIG. 1. The present invention provides a service request management system 102 for displaying, viewing, and managing requests for servicing items. In one embodiment of the present invention, the items being serviced include vehicles such as aircraft, land vehicles, water vessels, or any other vehicles. In another embodiment of the present invention, the items being serviced include commercial and military aircraft.

A variety of information can be associated with each item or vehicle being serviced. For example, each item or vehicle can have the following attributes, each of which has a corresponding value: a priority, a due date, a description, an item or vehicle type, a unique identifier and one or more service requests. Each service request can also have the following attributes, each of which has a corresponding value: a priority, a due date, a description, an item or vehicle type and a unique identifier. A status update can be associated with an item or a service request, wherein a status update can have the following attributes, each of which has a corresponding value: a percentage done or a delay indicator. A message can be associated with an item or a service request, wherein a message can have the following attributes, each of which has a corresponding value: a sender, a recipient, a body text, a date and a time. The values of attributes of each item, service request or status update can be modified or edited by a user of the service request management system 102 via a message or other transmitted medium.

FIG. 1 shows an embodiment of the present invention wherein users can interact with the service request management system 102 over a network 106, or an interface 130, such as in an enterprise or client-server implementation of the system 102 that services multiple users in more than one location and for multiple service requests and items. Users of the service request management system 102 may include operators or owners 122 of the items, the technicians servicing the items 124, the administrators 126 of the system 102 or any other authorized user 128 of the system 102. FIG. 1 shows user computers 122 through 128 connected to a network 106, or an interface 130. It should be noted that although FIG. 1 shows only four user computers 122 through 128, the system 102 of the present invention may support any number of user computers.

FIG. 1 also shows a service request management system 102 consisting of a server 110, a message database 114, a customer database 116, an aircraft health monitoring system (ACHMS) database 118, and a database management system (DBMS) 112. The service request management system 102 may be connected to the network 106 and an interface 130.

In an embodiment of the present invention, the computer systems of user computers 122 through 128 and service request management system 102 can be one or more Personal Computers (PCs), Personal Digital Assistants (PDAs), hand held computers, palm top computers, lap top computers, smart phones, game consoles or any other information processing devices. A PC can be one or more IBM or compatible PC workstations running a Microsoft Windows or LINUX operating system, one or more Macintosh computers running a Mac OS operating system, or an equivalent. In another embodiment, the computers 122 through 128 and service request management system 102 can be a server system, such as SUN Ultra workstations running a SunOS operating system or IBM RS/6000 workstations and servers running the AIX operating system.

In an embodiment of the present invention, the network 106 can be a circuit switched network. In another embodiment, the network 106 can be a packet switched network. The packet switched network can be a wide area network (WAN), such as the global Internet (or the World Wide Web), a private WAN, a local area network (LAN), a telecommunications network or any combination of the above-mentioned networks. In yet another embodiment, the structure of the network 106 can be a wired network, a wireless network, a broadcast network or a point-to-point network.

With regard to the client-server nature of the present invention, FIG. 1 shows the components of the service request management system 102, including a server 110, a message database 114, a customer database 116, an ACHMS database 118, and a DBMS 112. The message database 114 can, for example, be a repository for messages received by the service request management system 102 during the course of servicing items. A message can, for example, be an email message, a message received via a web page or web site or a message received by postal mail, telephone or in person and later input into the database. Messages can be sent by any user, such as operators or owners 122 of the items, the technicians servicing the items 124, the administrators 126 of the system 102 or any other authorized user 128. Messages can be received via the network 106 or interface 130 and can be stored in the message database 114 via the DBMS 112 or another application, such as an email server that receives and processes an email message. A message can instantiate, edit, or delete information associated with an item or vehicle, a service request or a status update.

The customer database 116 can be a repository for messages or other data received by the service request management system 102 from operators or owners 122 with regard to their items being serviced. A message can be any type of message as described for message database 114. The customer database 116 can further store other data received from an operator 122, such as an updated priority value or an updated due date for an item being serviced. The information stored in customer database 116 can be received via the network 106 or interface 130 and can be stored in the customer database 116 via the DBMS 112 or another application, such as an email server that receives and processes an email message. In one embodiment of the present invention, messages received from an operator 122 can be stored in message database 114.

The ACHMS database 118 can be a repository for messages or other data received by the service request management system 102 from an automated system connected to an item or vehicle being serviced. A message can be any type of message as described for message database 114. An aircraft health monitoring system (ACHMS) is an automated system, well known to one of ordinary skill in the art, which comprises an autonomous system that continuously monitors the operational health and maintenance of an aircraft and provides such information to interested parties. The ACHMS database 118 stores data received from an ACHMS, such as a system or component of an item that requires servicing. The information stored in ACHMS database 118 can be received via the network 106 or interface 130 and can be stored in the ACHMS database 118 via the DBMS 112 or another application, such as an email server that receives and processes an email message. In one embodiment of the present invention, messages received from an ACHMS can be stored in message database 114.

Databases 114, 116 and 118 can be any commercially available database, such as an Oracle Database, Enterprise or Personal Edition, available from Oracle Corporation, or a Microsoft SQL Server or Access 2000 database available from Microsoft Corporation. Database management system 112 can be an application that controls the organization, storage and retrieval of data (fields, records and files) in databases 114, 116 and 118. The database management system 112 accepts requests for data and instructs the operating system to transfer the appropriate data. Database management system 112 may also control the security and integrity of the databases 114, 116 and 118. Database management system 112 can be any commercially available database management system, such as the Oracle E-Business Suite available from Oracle Corporation.

FIG. 1 also shows that the service request management system 102 includes the server 110, which performs substantially the functions of the present invention. The server 110 reads the data pertinent to each item or vehicle being serviced, including service requests and status updates, and generates an icon for each item or vehicle. Each icon can be drawn in a graphical user interface for display in an interface such as a web page that is viewed in a Web browser or a window interface that can be viewed by a user on a computer. The icon may visually indicate the data pertinent to each item or vehicle being serviced using color, placement of the icon and a graphical object.

In one embodiment of the present invention, the service request management system 102 connects directly to the network 106 via a network interface, such as a network interface card. Optionally, the service request management system 102 may include a Web server 150 that connects to the network 106 via a network interface. The service request management system 102 may be logically connected to the Web server 150, which allows users (such as users 122-128) to access the service request management system 102 via the Web. This option is advantageous as it allows any users having a Web browser to connect to the service request management system 102. The Web provides a simple, efficient, highly compatible, economical and highly available connection to the service request management system 102 to a wide range of users.

In another embodiment of the present invention, the service request management system 102 includes an optional email server 151, such as a Simple Mail Transfer Protocol (SMTP) server, that connects to the network 106 via a network interface. The service request management system 102 can be logically connected to the email server 151 which allows users to access the service request management system 102 via email. This option is advantageous as it allows any users having an email client and a Web connection to communicate with the service request management system 102 via email. Email provides a simple, easy-to-use and highly available connection to the service request management system 102 to a wide range of users.

In one embodiment of the present invention, the mechanism by which the users 122-128 interact with the service request management system 102 can be a client application residing on the computer of the user. These client applications can comprise any one of a C++ program, a Visual Basic program, a Java applet, a Java scriptlet, a Java script, a Perl script, an Active X control or any self-sufficient application executing on a user computer. The users 122-128 can communicate with the service request management system 102 via a Web interface such as a commercially available Web browser, e.g., Netscape Navigator and Microsoft Internet Explorer.

In another embodiment of the present invention, the mechanism by which the users 122-128 interact with the service request management system 102 can be an interface 130 that connects directly to the service request management system 102. The interface 130 can be a client application, such as an application programmed in C++, Visual Basic, a Java applet, a Java scriptlet, Java script, Perl script, an Active X control or any self-sufficient application executing on a user computer. The interface 130 can communicate with the service request management system 102 via a Web interface such as a commercially available Web browser wherein the user enters and/or modifies data via a Web page.

It should be noted that in the embodiment of the present invention described above, the computers of users 122-128 are depicted as separate from the service request management system 102. In this embodiment, the computers of users 122-128 communicate with the computer system of the service request management system 102 over a network 106 or another communication medium. In an alternative embodiment of the present invention, any one or all of the computers of users 122-128 can be integrated with the computer system of the service request management system 102. In this alternative embodiment, those modules or clients that are integrated with the service request management system 102 share the same resources as the service request management system 102.

Figure 2:
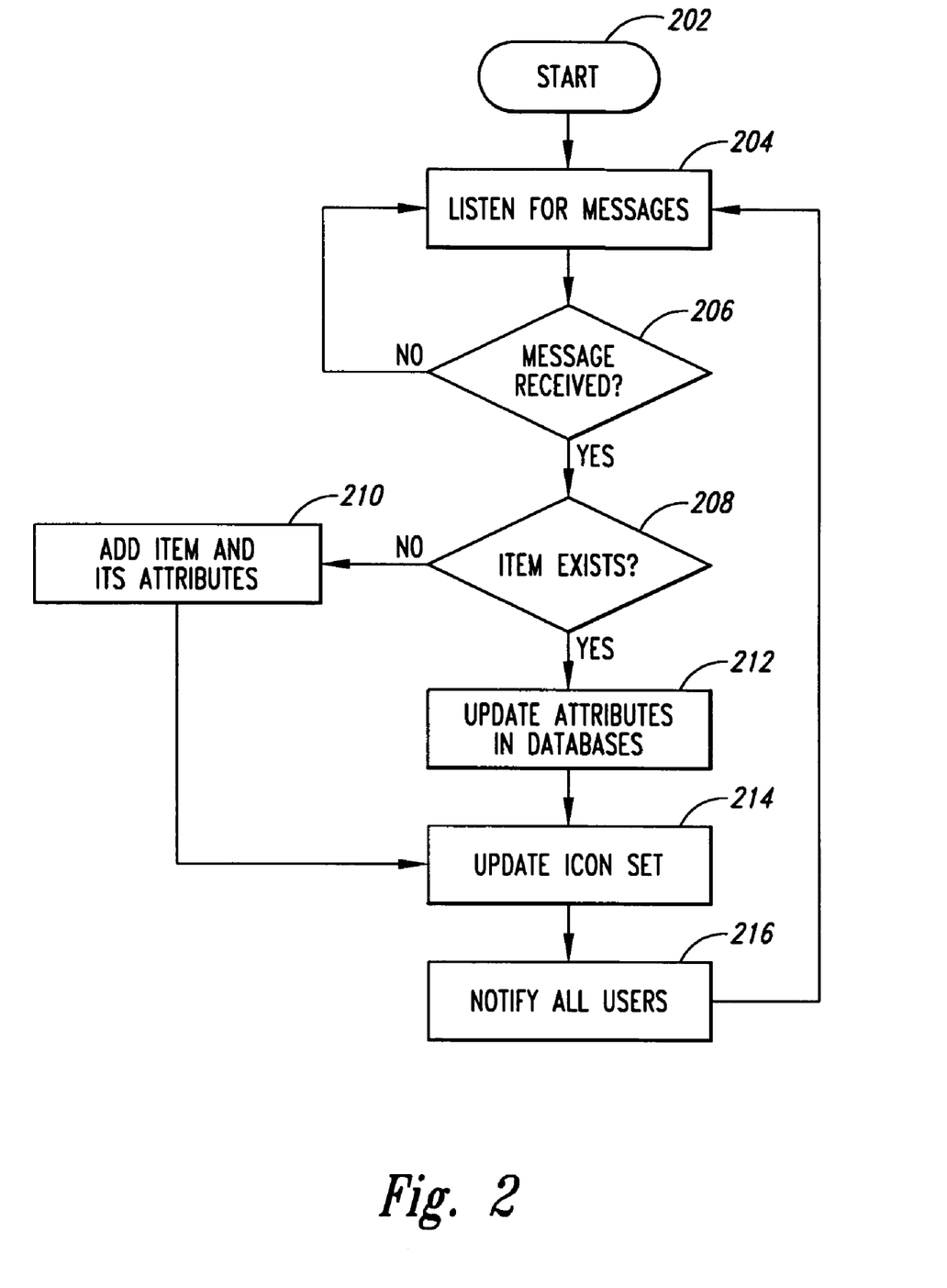
FIG. 2 is a flow chart showing the overall item prioritization process according to one embodiment of the present invention.

FIG. 2 is a flow chart showing the overall item prioritization process according to one embodiment of the present invention. The operation and control flow of FIG. 2 begins with step 202 and proceeds directly to step 204. In step 204, the service request management system 102 listens for messages or other updates of information associated with an item or vehicle, a service request or a status update. This information can be received via the network 106 or the interface 130, as described above. If the information received is a message, it can be stored in message database 114. If the information received is a status update, it can be stored in customer database 116. If the information received is a message from an ACHMS, it can be stored in ACHMS database 118. In step 206 it is determined whether a message or other update of information is received. If the determination of step 206 is negative, then control flows back to step 204.

If the determination of step 206 is positive, then control flows to step 208 where it is determined whether the message or other update of information pertains to an item or vehicle that is already being serviced. If the determination of step 208 is negative, then control flows to step 210. If the determination of step 208 is positive, then control flows to step 212. In step 210, the item or vehicle can be added to the pertinent repository, such as customer database 116. This addition includes the storing of attributes and corresponding values associated with each item, such as a priority, a due date, a description, an item or vehicle type, a unique identifier and one or more service requests. Each service request can also have the following attributes and corresponding values: a priority, a due date, a description, an item or vehicle type and a unique identifier.

In step 212, the information received was a message, status update or service request for an existing item or vehicle. The attributes of an item or vehicle, a status update or a service request can be updated according to the information provided in the information received. If the information received is a status update, the corresponding record in customer database 116 is modified. If the information received is a message from an ACHMS, the corresponding record in ACHMS database 118 is modified.

In step 214, the server 110 reads the data pertinent to each item or vehicle being serviced, including service requests and status updates, and generates an icon for each item or vehicle. Each icon can be drawn into an image for display in a graphical user interface such as a web page that is viewed in a Web browser or a window interface that can be viewed by a user on a computer. The icon may visually indicate the data pertinent to each item or vehicle being serviced using color, placement of the icon and a graphical object. In step 216, all users of the service request management system 102 can be notified of the update to the icon set. Control flows back to step 204, where the service request management system 102 listens for additional messages or other updates of information.

In one embodiment of the present invention, the process of the present invention described in the flowchart of FIG. 2 occurs automatically so as to allow all users of the service request management system 102 to interface with the system 102 in real time. This feature allows users to view the status and condition of items or vehicles as they occur, or shortly thereafter. This feature further allows users to modify the status and condition of items or vehicles expeditiously. In another embodiment of the present invention, the process of the present invention described in the flowchart of FIG. 2 occurs either periodically or at a user's request.

Figure 3:
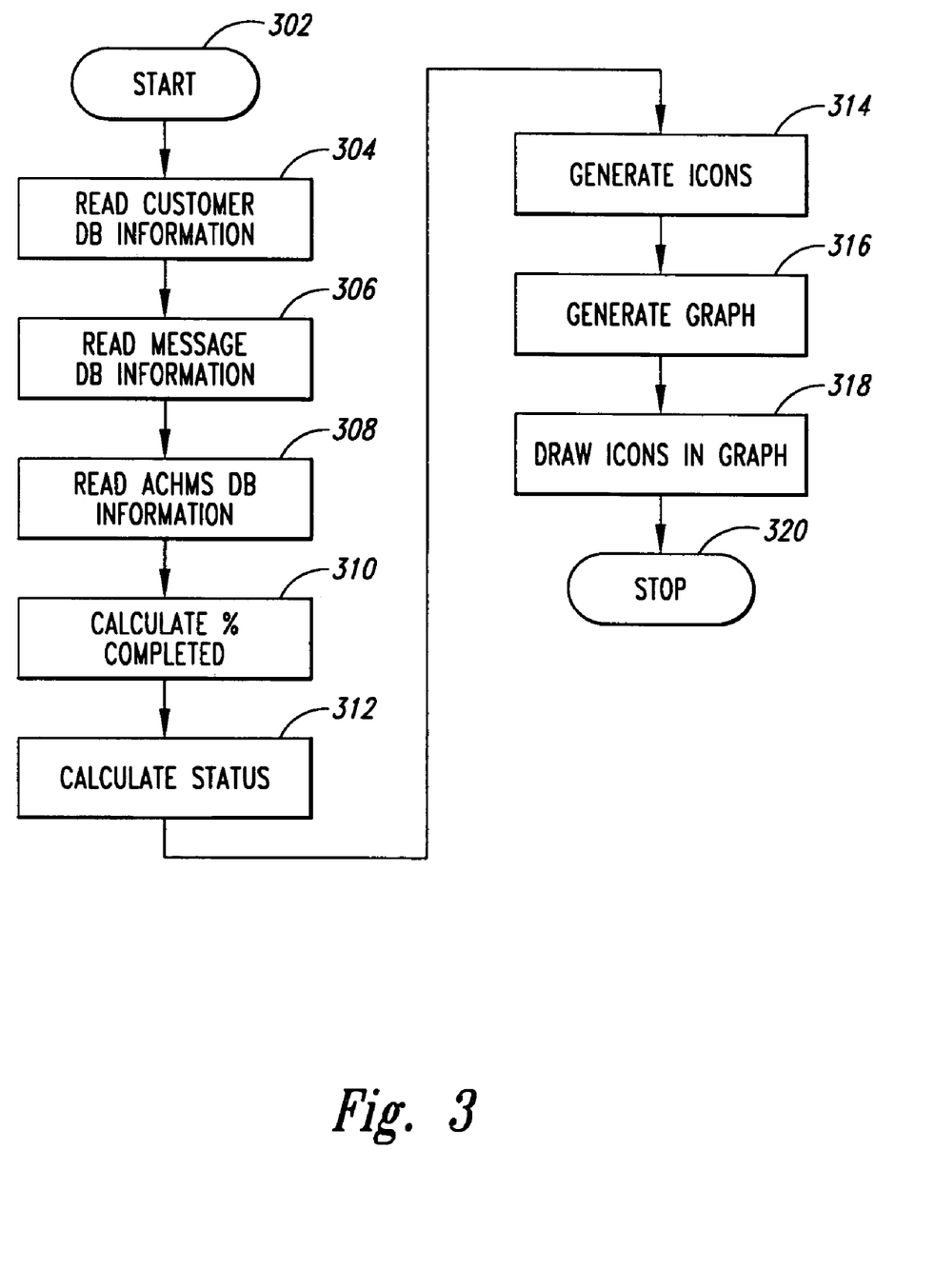
FIG. 3 is a flow chart showing the graphic generation process according to one embodiment of the present invention.

The server 110 may use a variety of algorithms for generating an icon for each item or vehicle and drawing each icon into an image for display in a graphical user interface or a window interface. FIG. 3 is a flow chart showing the graphic generation process according to one embodiment of the present invention. FIG. 3 shows one example of an algorithm that can be used to generate an image with multiple icons.

This example pertains to a service request management system 102 that manages service requests for aircraft. The operation and control flow of FIG. 3 begins with step 302 and proceeds directly to step 304.

In step 304, all attribute information for the aircraft can be read from, for example, the customer database 116. This step includes the reading of all corresponding service requests and their attributes. In step 306, all messages for the aircraft can be read from, for example, the message database 114. This step includes the reading of all corresponding service requests and status updates. Aircraft vehicle, status update and service request attributes can be updated using updated values from messages. In step 308, all pertinent information for the aircraft can be read from, for example, the ACHMS database 118.

In step 310, the service request management system 102 calculates the percent completed for each aircraft, i.e., a value indicating the percentage of a vehicle's service requests that have been completed. This value can be calculated using the status updates and the corresponding values that were received for the aircraft via messages. The resulting value can be overridden by an updated percent completed value for each aircraft received by the operator 122 of the aircraft in a message or other communication medium.

In step 312, the service request management system 102 calculates the status of each aircraft. Status can be defined as four separate levels: the first level can be an aircraft currently in the process of being serviced with a due date in the future, the second level can be an aircraft not currently being serviced with a due date in the future, the third level can be an aircraft not currently being serviced with a due date of the current day, and the fourth level can be an aircraft that is not currently being serviced or grounded (such as an Airplane On Ground) with a due date of the current day. The status of each aircraft can be overridden by an updated status value for the aircraft received by the operator 122 of the aircraft in a message or other communication medium.

In step 314, a graphical object, or icon, resembling an airplane can be generated to represent each aircraft. A color indicating the status of each aircraft can be used to color the icon. For example, green for the first level, yellow for the second level, red for the third level and blinking red for the fourth level. In step 316, the service request management system 102 generates a graph having an x-axis and a y-axis. The y-axis represents the completion index for an aircraft, i.e., a percent done value, wherein the top of the axis represents a 100% completed aircraft and the bottom of the axis represents a 0% completed aircraft. In step 318, the icons for the aircraft can be placed in the graph at a y-axis location according to the percent completed value of each aircraft. In step 320, the control flow of FIG. 3 stops.

Figure 4:
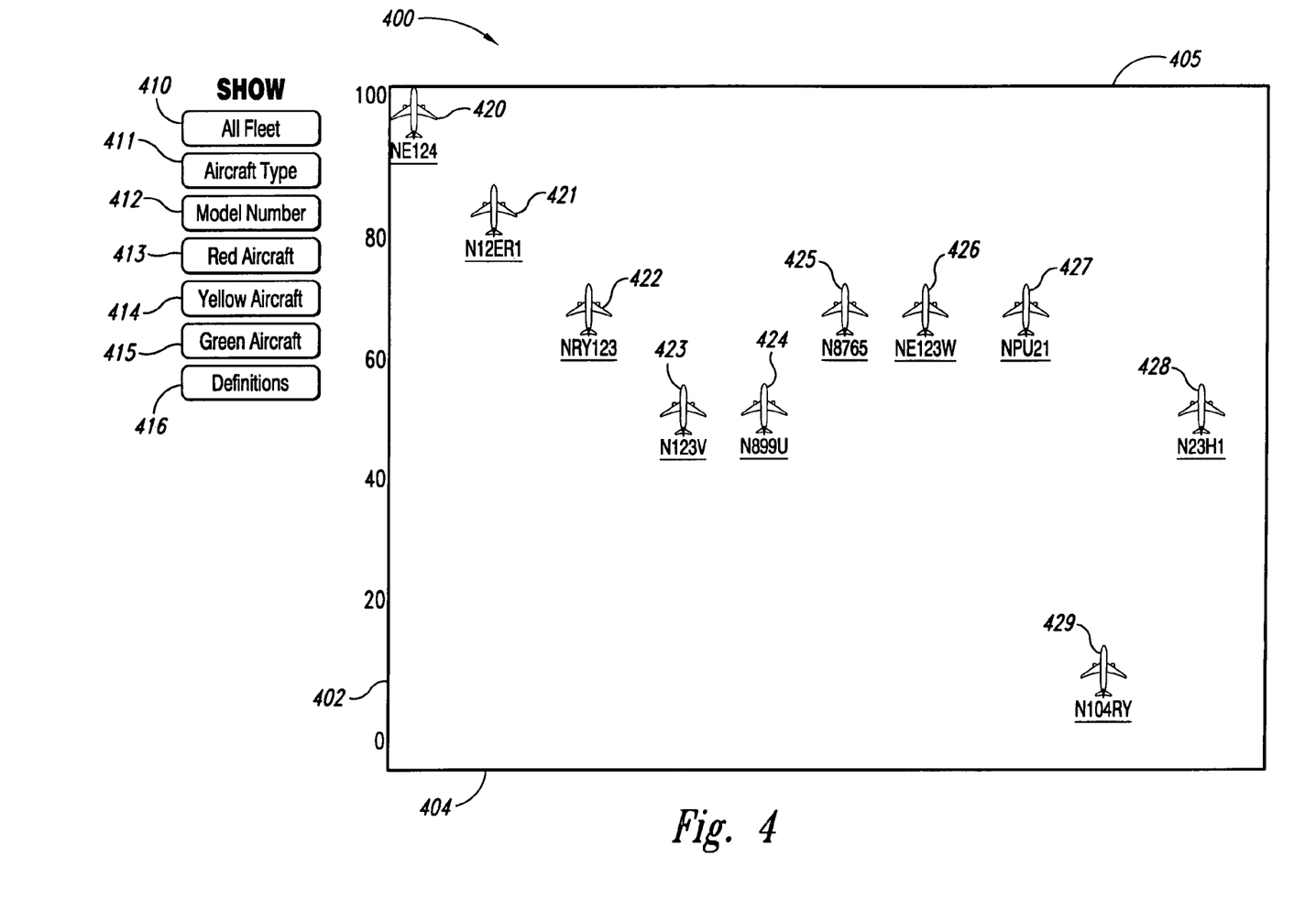
FIG. 4 is an illustration of a graphical user interface produced by one embodiment of the present invention.

FIG. 4 is an illustration of a graphical user interface 400 produced by one embodiment of the present invention. The graphical user interface 400 is an example of an image produced by the service request management system 102 using the process described by the flow chart of FIG. 3. The interface 400 shows a graph 405 having an x-axis 404 and a y-axis 402. The y-axis 402 represents a percent completed value for an aircraft, wherein the top of the axis represents a 100% completed aircraft and the bottom of the axis represents a 0% completed aircraft.

The graph 405 also shows a plurality of aircraft plotted as icons 420-429. Each aircraft can be designated by an icon resembling an airplane and a unique identifier. Each aircraft can also be designated with a color, wherein color indicates status. For example, green for the first level, yellow for the second level, and red for the third level. The graph 405 shows aircraft 420-421, 423-425, 427 and 429 indicate first level status. The graph 405 further shows aircraft 428 indicates second level status and aircraft 422 and 426 indicate third level status.

Figure 5:
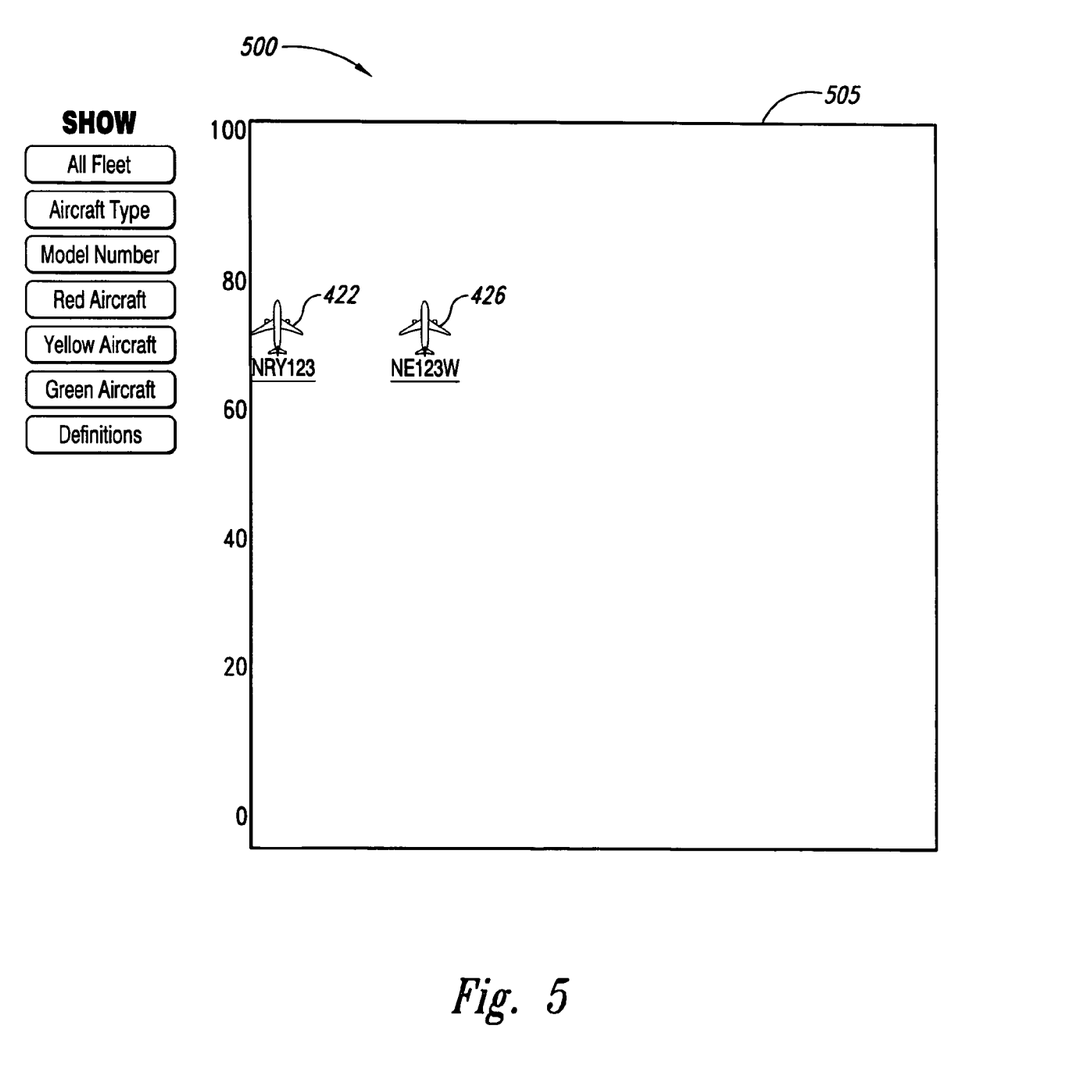
FIG. 5 is an illustration of another graphical user interface produced by one embodiment of the present invention.
Figure 6:
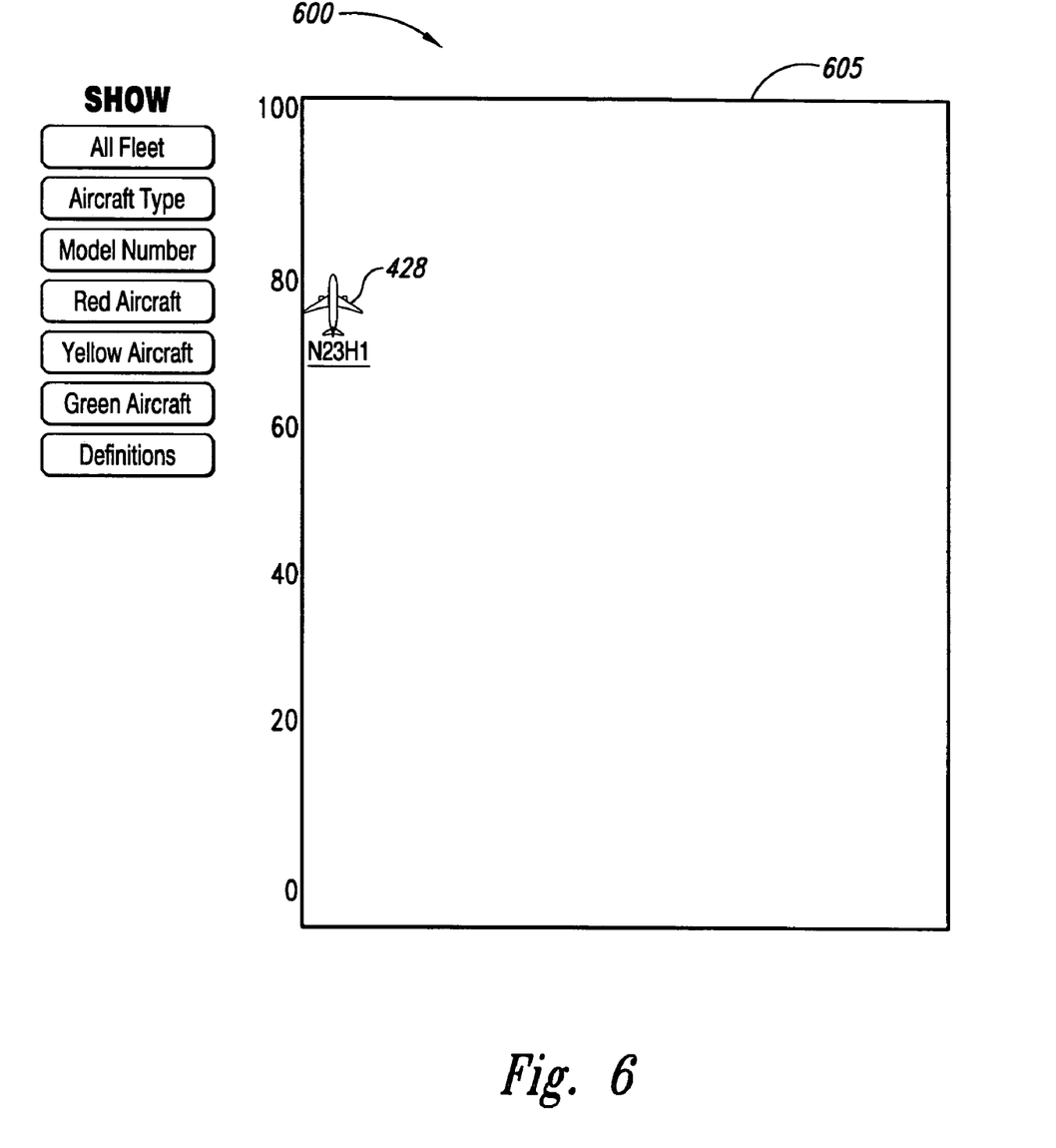
FIG. 6 is an illustration of another graphical user interface produced by one embodiment of the present invention.
Figure 7:
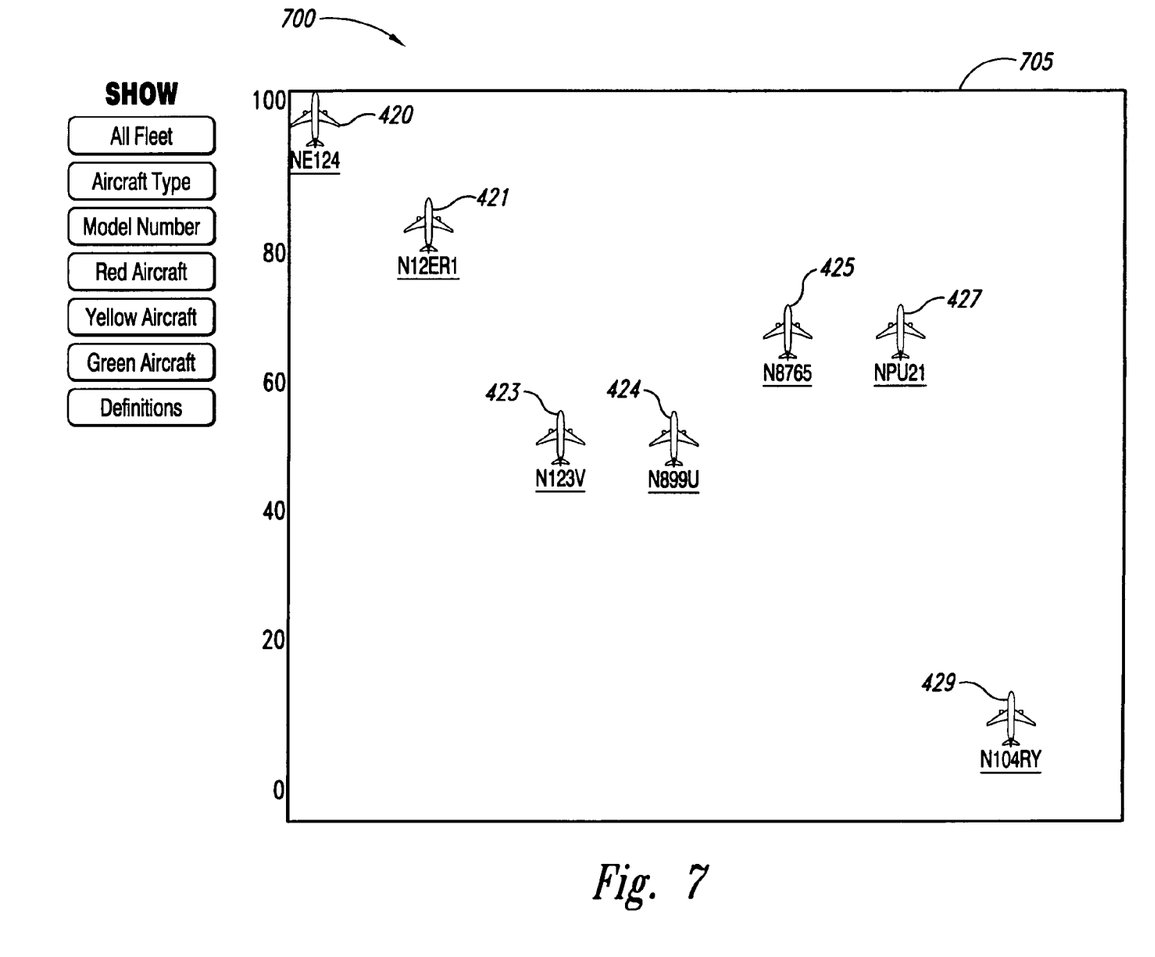
FIG. 7 is an illustration of another graphical user interface produced by one embodiment of the present invention.

The interface 400 also shows a set of buttons 410, 411, 412, 413, 414, 415 and 416. Clicking on button 410, marked "All Fleet," displays an interface showing a graph identical to graph 405 wherein all aircraft can be displayed. Clicking on button 411, marked "Aircraft Type," displays an interface showing a graph similar to graph 405 wherein all aircraft can be displayed and sorted by type of aircraft. Clicking on button 412, marked "Model Number," displays an interface showing a graph similar to graph 405 wherein all aircraft can be displayed and sorted by model number. Clicking on button 413, marked "Red Aircraft," displays an interface 500 of FIG. 5 showing a graph 505 wherein all aircraft designated with a third level status, icons 422 and 426, can be displayed. Clicking on button 414, marked "Yellow Aircraft," displays an interface 600 of FIG. 6 showing a graph 605 wherein all aircraft designated with a second level status, icon 428, can be displayed. Clicking on button 415, marked "Green Aircraft," displays an interface 700 of FIG. 7 showing a graph 705 wherein all aircraft designated with a first level status, icons 420-421, 423-425, 427 and 429, can be displayed.

Figure 8:
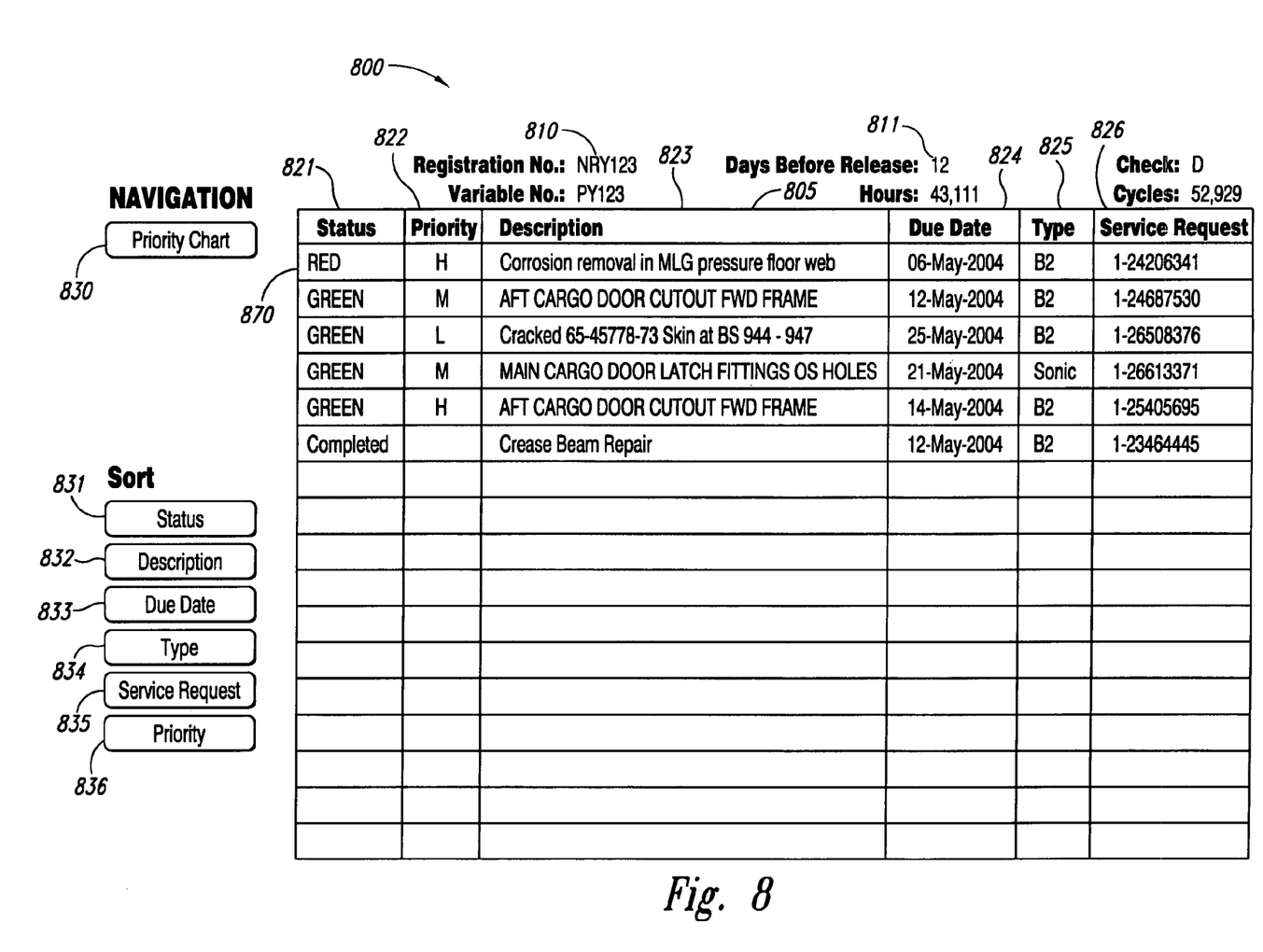
FIG. 8 is an illustration of another graphical user interface produced by one embodiment of the present invention.

It should be noted that each icon in graph 405 can be hyperlinked and can spawn a new interface or web page. For example, clicking on icon 422 displays an interface 800 of FIG. 8 showing a chart 805 wherein attribute information for the aircraft and all service requests for the aircraft can be displayed. Attribute information such as a unique identifier 810 and a number of days 811 before release of the aircraft can be displayed along the top of the chart 805. The chart 805 includes a series of columns such as column 821 showing a status indicator for each service request, column 822 showing a priority indicator for each service request, column 823 showing a description for each service request, column 824 showing a due date for each service request, column 825 showing a type for each service request, and column 826 showing a unique identifier for each service request.

Figure 9:
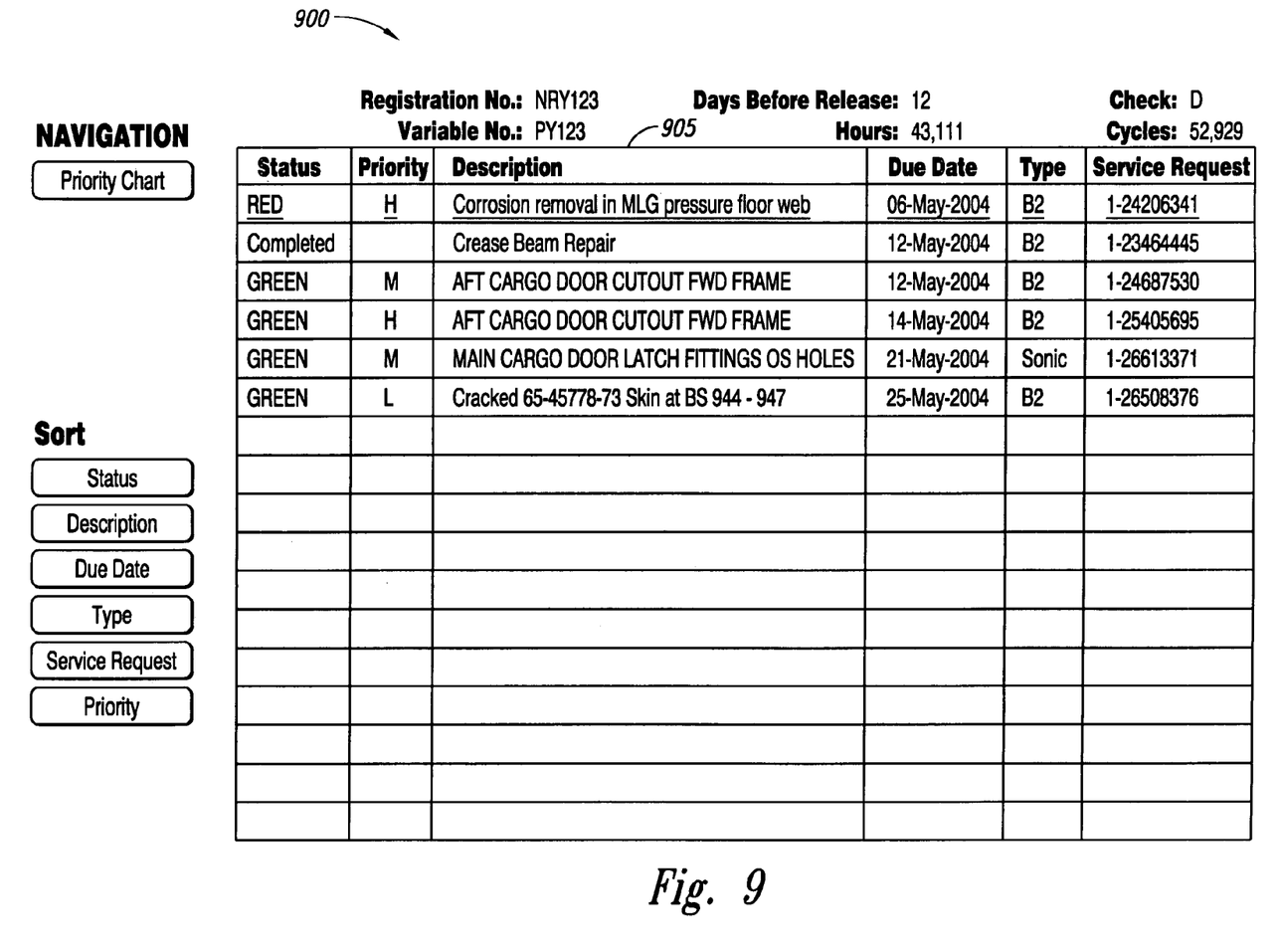
FIG. 9 is an illustration of another graphical user interface produced by one embodiment of the present invention.

The interface 800 also shows a set of buttons 830, 831, 832, 833, 834, 835, and 836. Clicking on button 830, marked "Priority Chart," displays an interface identical to interface 400. Clicking on button 831, marked "Status," displays an interface showing a graph identical to graph 805 wherein all rows can be sorted by status indicator. Clicking on button 832, marked "Description," displays an interface showing a graph identical to graph 805 wherein all rows can be sorted by description. Clicking on button 833, marked "Due Date," displays an interface 900 of FIG. 9 showing a graph 905 wherein all rows can be sorted by due date. Clicking on button 834, marked "Type," displays an interface showing a graph identical to graph 805 wherein all rows can be sorted by service request type. Clicking on button 835, marked "Service Request," displays an interface showing a graph identical to graph 805 wherein all rows can be sorted by service request unique identifier. Clicking on button 836, marked "Priority," displays an interface showing a graph identical to graph 805 wherein all rows can be sorted by service request priority.

Figure 10:
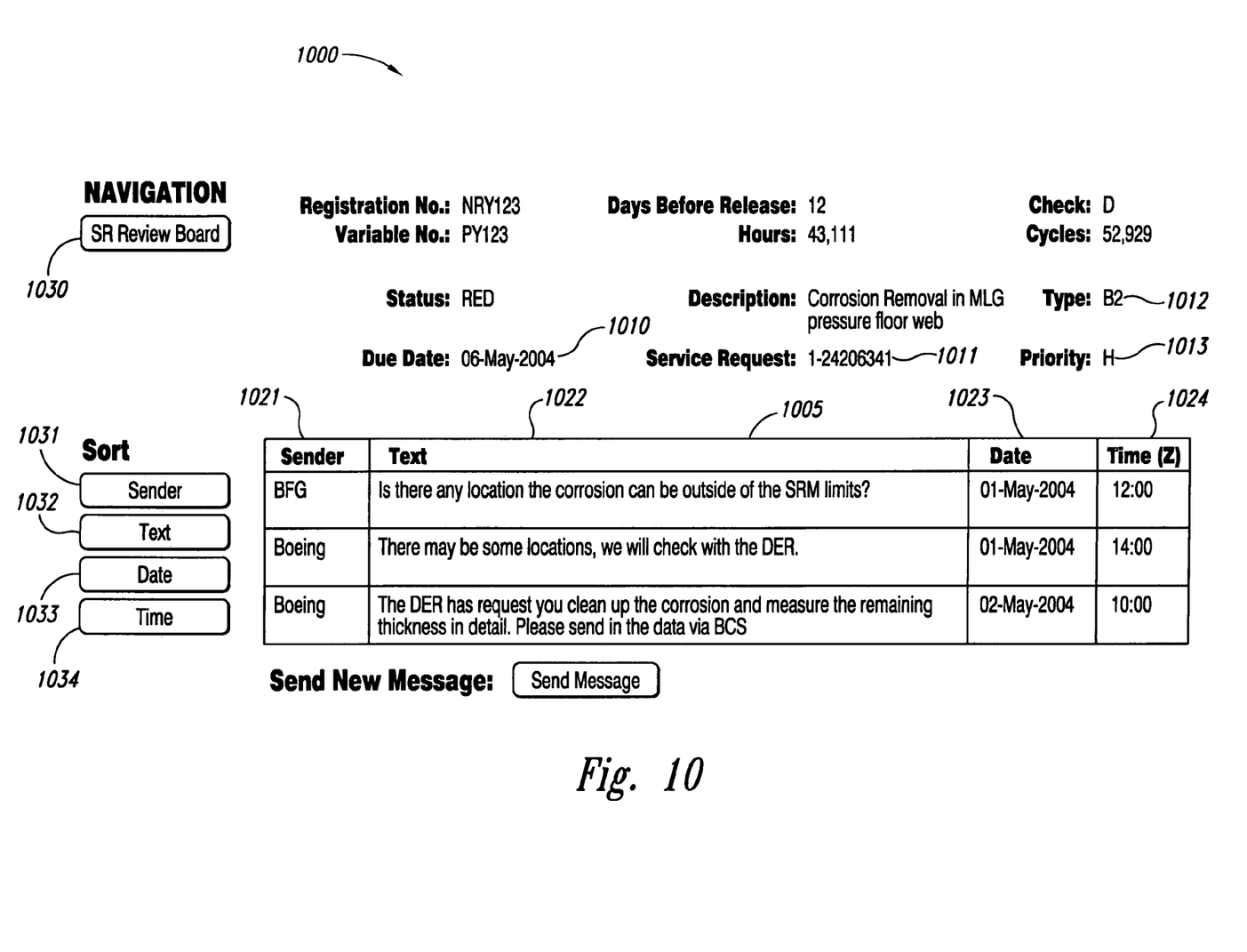
FIG. 10 is an illustration of another graphical user interface produced by one embodiment of the present invention.

It should be noted that each service request in a row of graph 805 can be hyperlinked and can spawn a new interface. For example, clicking on the first row 870 of chart 805, which is identified by service request number 1-24206341, displays an interface 1000 of FIG. 10 showing a chart 1005 wherein attribute information for the service request and all messages for the service request can be displayed. Attribute information such as a unique identifier 1011, a due date 1010, a service request type 1012 and a priority 1013 can be displayed in along the top of the chart 1005. The chart 1005 includes a series of columns such as column 1021 showing a sender for each message, column 1022 showing the text for each message, column 1023 showing a date for each message and column 1024 showing the time for each message.

The interface 1000 also shows a set of buttons 1030, 1031, 1032, 1033 and 1034. Clicking on button 1030, marked "SR Review Board," displays an interface identical to interface 800. Clicking on button 1031, marked "Sender," displays an interface showing a chart identical to chart 1005 wherein all rows can be sorted by sender. Clicking on button 1032, marked "Text," displays an interface showing a chart identical to chart 1005 wherein all rows can be sorted by text. Clicking on button 1033, marked "Date," displays an interface showing a chart identical to chart 1005 wherein all rows can be sorted by date. Clicking on button 1034, marked "Time," displays an interface showing a chart identical to chart 1005 wherein all rows can be sorted by time.

The present invention can be realized in hardware, software, or a combination of hardware and software in the system described in FIG. 1. A system according to a preferred embodiment of the present invention can be realized in a centralized fashion in one computer system or in a distributed fashion where different elements can be spread across several interconnected computer systems. Any kind of computer system—or other apparatus adapted for carrying out the methods described herein—can be suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—can be able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk 20 drive memory, CD-ROM, and other permanent storage. Additionally, a computer readable medium may include, for example, volatile storage such as RAM, buffers, cache memory, and network circuits.

Figure 11:
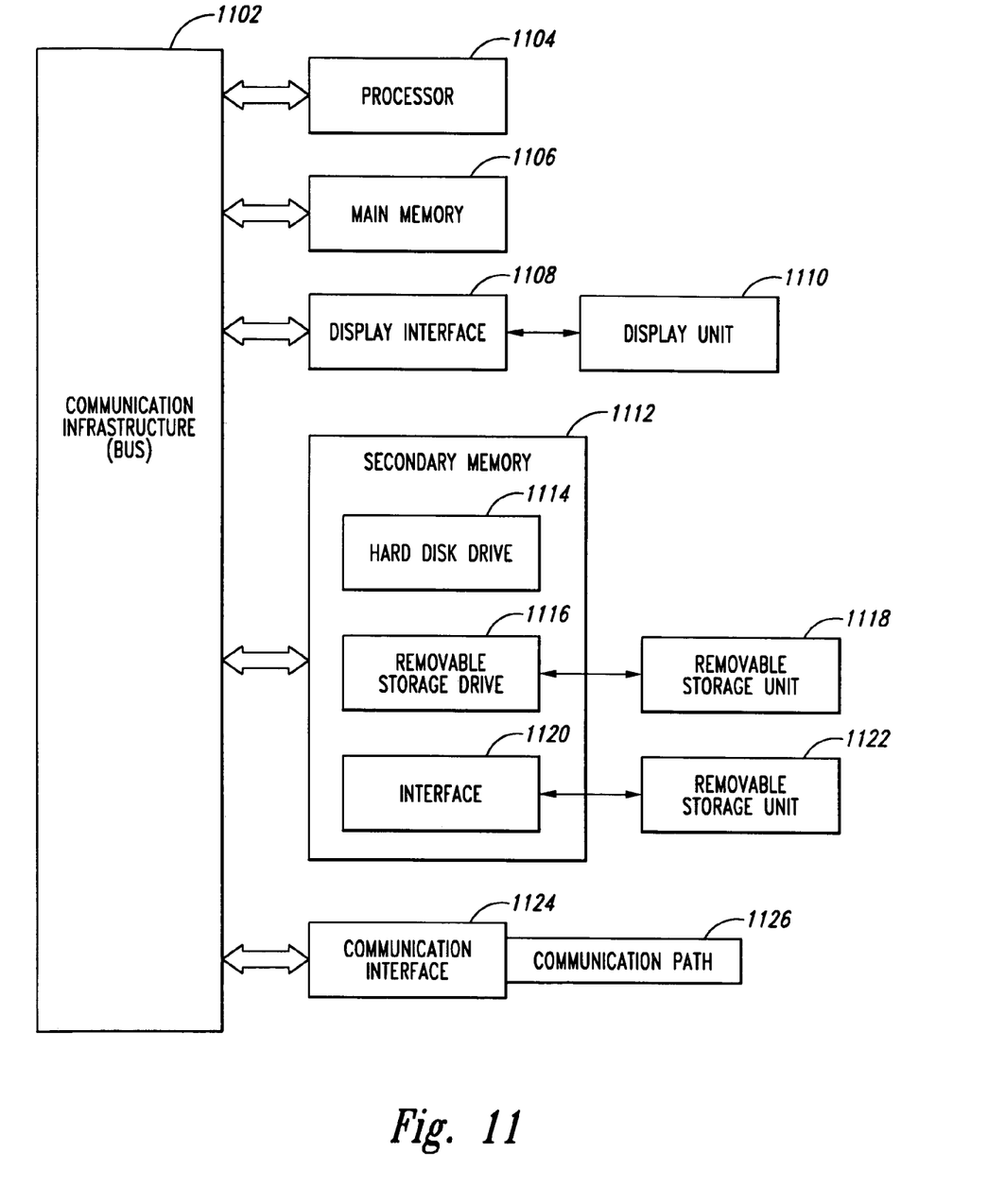
FIG. 11 is a block diagram showing a computer implementing a system in accordance with one embodiment of the present invention.

FIG. 11 is a block diagram of a computer system useful for implementing an embodiment of the present invention. The computer system of FIG. 11 is a more detailed representation of computers 122-128 and the computers of the service request management system 102 of the present invention. The computer system of FIG. 11 includes one or more processors, such as processor 1104. The processor 1104 can be connected to a communication infrastructure 1102 (e.g., a communications bus, cross-over bar, or network). Various software embodiments can be described in terms of this exemplary computer system. After reading this description, it will become apparent to a person of ordinary skill in the relevant art(s) how to implement the invention using other computer systems and/or computer architectures.

The computer system can include a display interface 1108 that forwards graphics, text, and other data from the communication infrastructure 1102 (or from a frame buffer not shown) for display on the display unit 1110. The computer system also includes a main memory 1106, preferably random access memory (RAM), and may also include a secondary memory 1112. The secondary memory 1112 may include, for example, a hard disk drive 1114 and/or a removable storage drive 1116, representing a floppy disk drive, a magnetic tape drive, an optical disk drive, etc. The removable storage drive 1116 reads from and/or writes to a removable storage unit 1118 in a manner well known to those having ordinary skill in the art. Removable storage unit 1118, represents, for example, a floppy disk, magnetic tape, optical disk, etc. which can be read by and written to by removable storage drive 1116. As will be appreciated, the removable storage unit 1118 includes a computer usable storage medium having stored therein computer software and/or data.

In alternative embodiments, the secondary memory 1112 may include other similar means for allowing computer programs or other instructions to be loaded into the computer system. Such means may include, for example, a removable storage unit 1122 and an interface 1120. Examples of such may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to the computer system.

The computer system may also include a communications interface 1124. Communications interface 1124 allows software and data to be transferred between the computer system and external devices. Examples of communications interface 1124 may include a modem, a network interface (such as an Ethernet card), a communications port, a PCMCIA slot and card, etc. Software and data transferred via communications interface 1124 can be in the form of signals which may be, for example, electronic, electromagnetic, optical, or other signals capable of being received by communications interface 1124. These signals can be provided to communications interface 1124 via a communications path (i.e., channel) 1126. This channel 1126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 1106 and secondary memory 1112, removable storage drive 1116, a hard disk installed in hard disk drive 1114, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be useful, for example, for transporting information, such as data and computer instructions, between computer systems. Furthermore, the computer readable medium may comprise computer readable information in a transitory state medium such as a network link and/or a network interface, including a wired network or a wireless network that allows a computer to read such computer readable information.

Computer programs (also called computer control logic) can be stored in main memory 1106 and/or secondary memory 1112. Computer programs may also be received via communications interface 1124. Such computer programs, when executed, enable the computer system to perform the features of the present invention as discussed herein. In particular, the computer programs, when executed, enable the processor 1104 to perform the features of the computer system. Accordingly, such computer programs represent controllers of the computer system.

It should be understood, of course, that the foregoing relates to exemplary embodiments of the invention and that modifications may be made without departing from the spirit and scope of the invention as set forth in the following claims.

We claim:

1. A method, implemented in a computer, for prioritizing an order in which vehicles are to be serviced, the method comprising:

monitoring for information associated with at least one of a number of vehicles, a number of items, a service request, and a status update;

receiving first information associated with a first vehicle to be serviced, wherein the first information comprises a first priority value, a first due date, and a first service request;

receiving second information associated with a second vehicle to be serviced, wherein the second information comprises a second priority value, a second due date, and a second service request;

generating a first icon for the first vehicle and a second icon for the second vehicle, wherein a unique identifier is associated with each icon generated;

calculating a first priority, wherein the first priority determines a first order in which the first vehicle and the second vehicle are to be serviced, and wherein the first priority is calculated based on all of the first priority value, the second priority value, the first due date, the second due date, the first service request, and the second service request, wherein the first vehicle and the second vehicle are serviced in accordance with the calculated first priority;

displaying, in a graphical user interface, the first icon and the second icon on a graph having a x-axis and a y-axis using a number of visual indicators to represent the information associated with each of the vehicles that each of the icons represent, wherein the number of visual indicators include relative positions of the first icon and the second icon in the graph to depict the first priority, wherein the first icon visually indicates the first due date, a first status update, a first description, the first unique identifier, and a first vehicle type, and wherein the second icon visually indicates the second due date, a second status update, a second description, the second unique identifier, and a second vehicle type;

receiving, during the servicing the first vehicle and the second vehicle in accordance with the calculated first priority, a message regarding at least one of the first vehicle and the second vehicle, wherein the message includes an updated value for at least one of the first priority value, the second priority value, the first due date, the second due date, the first service request, and the second service request;

responsive to receiving the message, calculating a second priority, wherein the second priority determines a second order in which the first vehicle and the second vehicle are to be serviced, wherein the second priority is calculated based on all of the first priority value, the second priority value, the first due date, the second due date, the first service request, and the second service request, but wherein the updated value is used for the one of the first priority value, the second priority value, the first due date, the second due date, the first service request, and the second service request that was updated, wherein the first vehicle and the second vehicle are thereafter serviced in accordance with the calculated second priority; and updating the position of at least one of the first icon and the second icon on the graph in the graphical user interface using the second priority calculated based on the updated value received.

2. The method of claim 1, wherein the first information is received from a first sender and the second information is received from a second sender, wherein a sender of the message comprises one of the first sender or the second sender, wherein the message further comprises an identity of the sender of the message, and wherein calculating the second priority is further based on the identity of the sender of the message.

3. The method of claim 1 wherein the first priority is different than the second priority.

4. The method of claim 1 further comprising:
changing the first due date based on the second priority.

5. The method of claim 1, wherein the first vehicle and the second vehicle are selected from the group consisting of: an aircraft, a land vehicle, a water vessel, and an aerospace vessel.

6. The method of claim 1 wherein the message further comprises a description of one of the first vehicle and the second vehicle and a vehicle type of one of the first vehicle and the second vehicle, and wherein calculating the second priority is further based on the description and the vehicle type.

7. The method of claim 1 wherein the first icon and the second icon together visually indicates the second priority, the due date, and at least one of a percentage done value and a delay indicator for one of the first vehicle and the second vehicle.

8. A computer program product stored in a computer readable medium, wherein the computer program product can be executed to perform a computer implemented method for prioritizing an order in which vehicles are to be serviced, the computer implemented method comprising:

monitoring for information associated with at least one of a number of vehicles, a number of items, a service request, and a status update;

receiving first information associated with a first vehicle to be serviced, wherein the first information comprises a first priority value, a first due date, and a first service request;

receiving second information associated with a second vehicle to be serviced, wherein the second information comprises a second priority value, a second due date, and a second service request;

generating a first icon for the first vehicle and a second icon for the second vehicle, wherein a unique identifier is associated with each icon generated;

calculating a first priority, wherein the first priority determines a first order in which the first vehicle and the second vehicle are to be serviced, and wherein the first priority is calculated based on all of the first priority value, the second priority value, the first due date, the second due date, the first service request, and the second service request, wherein the first vehicle and the second vehicle are serviced in accordance with the calculated first priority;

displaying, in a graphical user interface, the first icon and the second icon on a graph having a x-axis and a y-axis using a number of visual indicators to represent the information associated with each of the vehicles that each of the icons represent, wherein the number of visual indicators include relative positions of the first icon and the second icon in the graph to depict the first priority, wherein the first icon visually indicates the first due date, a first status update, a first description, the first unique identifier, and a first vehicle type, and wherein the second icon visually indicates the second due date, a second status update, a second description, the second unique identifier, and a second vehicle type;

receiving, during the servicing the first vehicle and the second vehicle in accordance with the calculated first priority, a message regarding at least one of the first vehicle and the second vehicle, wherein the message includes an updated value for at least one of the first priority value, the second priority value, the first due date, the second due date, the first service request, and the second service request;

responsive to receiving the message, calculating a second priority, wherein the second priority determines a second order in which the first vehicle and the second vehicle are to be serviced, wherein the second priority is calculated based on all of the first priority value, the second priority value, the first due date, the second due date, the first service request, and the second service request, but wherein the updated value is used for the one of the first priority value, the second priority value, the first due date, the second due date, the first service request, and the second service request that was updated, wherein the first vehicle and the second vehicle are thereafter serviced in accordance with the calculated second priority; and updating the position of at least one of the first icon and the second icon on the graph in the graphical user interface using the second priority calculated based on the updated value received.

9. The computer program product of claim 8, wherein the first information is received from a first sender and the second information is received from a second sender, wherein a sender of the message comprises one of the first sender or the second sender, wherein the message further comprises an identity of the sender of the message, and wherein calculating the second priority is further based on the identity of the sender of the message.

10. The computer program product of claim 8 wherein the first priority is different than the second priority.

11. The computer program product of claim 8, wherein the computer implemented method further comprises:
changing the first due date based on the second priority.

12. The computer program product of claim 8, wherein the first vehicle and the second vehicle are selected from the group consisting of: an aircraft, a land vehicle, a water vessel, and an aerospace vessel.

13. The computer program product of claim 8 wherein the message further comprises a description of one of the first vehicle and the second vehicle and a vehicle type of one of the first vehicle and the second vehicle, and wherein calculating the second priority is further based on the description and the vehicle type.

14. A data processing system comprising:
a bus;
a processor connected to the bus;
a memory connected to the bus, wherein the memory stores a set of instructions, and wherein the processor can execute the set of instructions to perform a computer implemented method for prioritizing an order in which vehicles are to be serviced, the computer implemented method comprising:

monitoring for information associated with at least one of a number of vehicles, a number of items, a service request, and a status update;

receiving first information associated with a first vehicle to be serviced, wherein the first information comprises a first priority value, a first due date, and a first service request;

receiving second information associated with a second vehicle to be serviced, wherein the second information comprises a second priority value, a second due date, and a second service request;

generating a first icon for the first vehicle and a second icon for the second vehicle, wherein a unique identifier is associated with each icon generated;

calculating a first priority, wherein the first priority determines a first order in which the first vehicle and the second vehicle are to be serviced, and wherein the first priority is calculated based on all of the first priority value, the second priority value, the first due date, the second due date, the first service request, and the second service request, wherein the first vehicle and the second vehicle are serviced in accordance with the calculated first priority;

displaying, in a graphical user interface, the first icon and the second icon on a graph having a x-axis and a y-axis using a number of visual indicators to represent the information associated with each of the vehicles that each of the icons represent, wherein the number of visual indicators include relative positions of the first icon and the second icon in the graph to depict the first priority, wherein the first icon visually indicates the first due date, a first status update, a first description, the first unique identifier, and a first vehicle type, and wherein the second icon visually indicates the second due date, a second status update, a second description, the second unique identifier, and a second vehicle type;

receiving, during the servicing the first vehicle and the second vehicle in accordance with the calculated first priority, a message regarding at least one of the first vehicle and the second vehicle, wherein the message includes an updated value for at least one of the first priority value, the second priority value, the first due date, the second due date, the first service request, and the second service request;

responsive to receiving the message, calculating a second priority, wherein the second priority determines a second order in which the first vehicle and the second vehicle are to be serviced, wherein the second priority is calculated based on all of the first priority value, the second priority value, the first due date, the second due date, the first service request, and the second service request, but wherein the updated value is used for the one of the first priority value, the second priority value, the first due date, the second due date, the first service request, and the second service request that was updated, wherein the first vehicle and the second vehicle are thereafter serviced in accordance with the calculated second priority; and updating the position of at least one of the first icon and the second icon on the graph in the graphical user interface using the second priority calculated based on the updated value received.

15. The data processing system of claim 14, wherein the first information is received from a first sender and the second information is received from a second sender, wherein a sender of the message comprises one of the first sender or the second sender, wherein the message further comprises an identity of the sender of the message, and wherein calculating the second priority is further based on the identity of the sender of the message.

16. The data processing system of claim 14 wherein the first priority is different than the second priority.

17. The data processing system of claim 14, wherein the computer implemented method further comprises:

changing the first due date based on the second priority.

18. The data processing system of claim 14, wherein the first vehicle and the second vehicle are selected from the group consisting of: an aircraft, a land vehicle, a water vessel, and an aerospace vessel.

19. The data processing system of claim 14, wherein the message further comprises a description of one of the first vehicle and the second vehicle and a vehicle type of one of the first vehicle and the second vehicle, and wherein calculating the second priority is further based on the description and the vehicle type.

* * * * *